Figure 1:
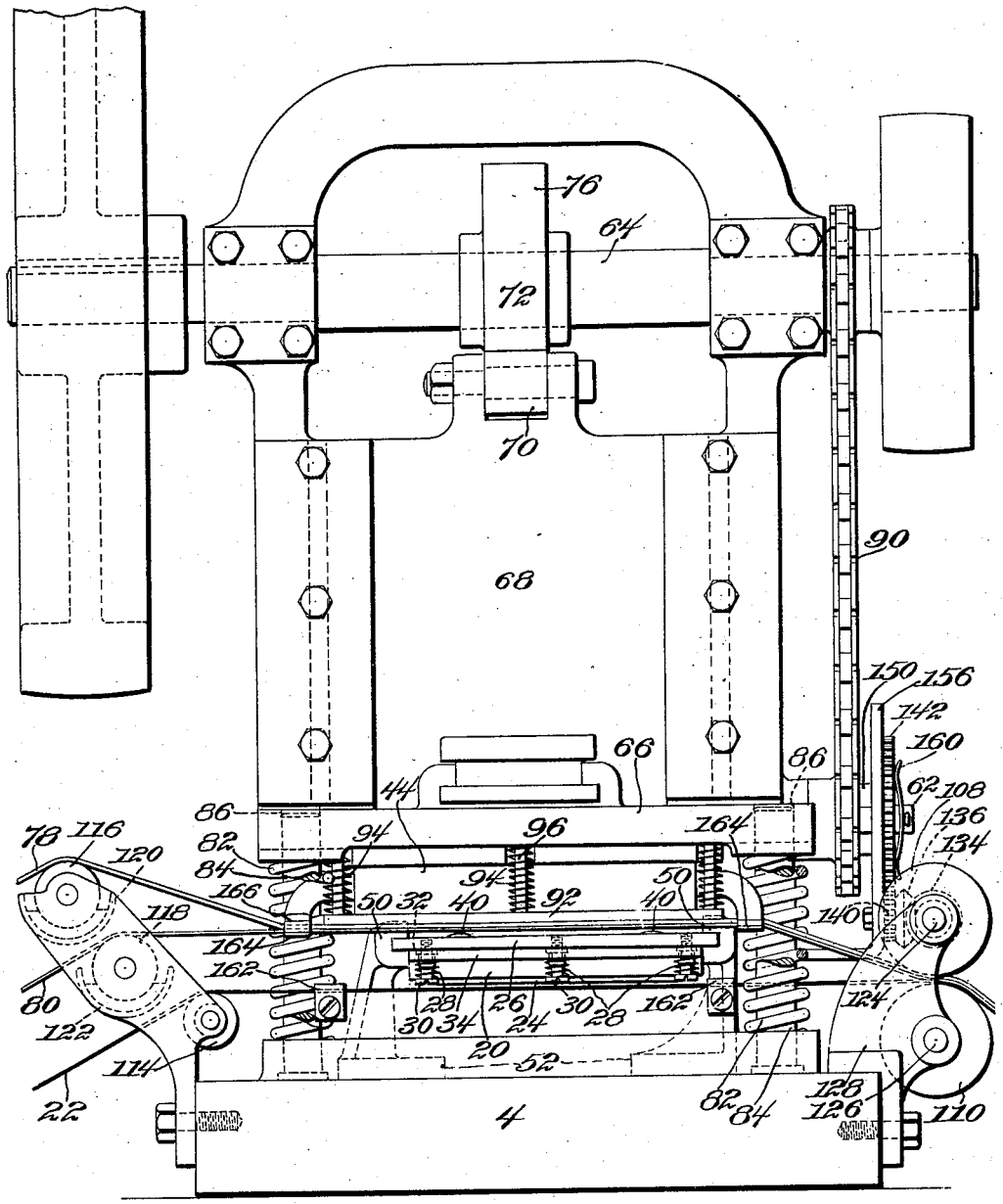

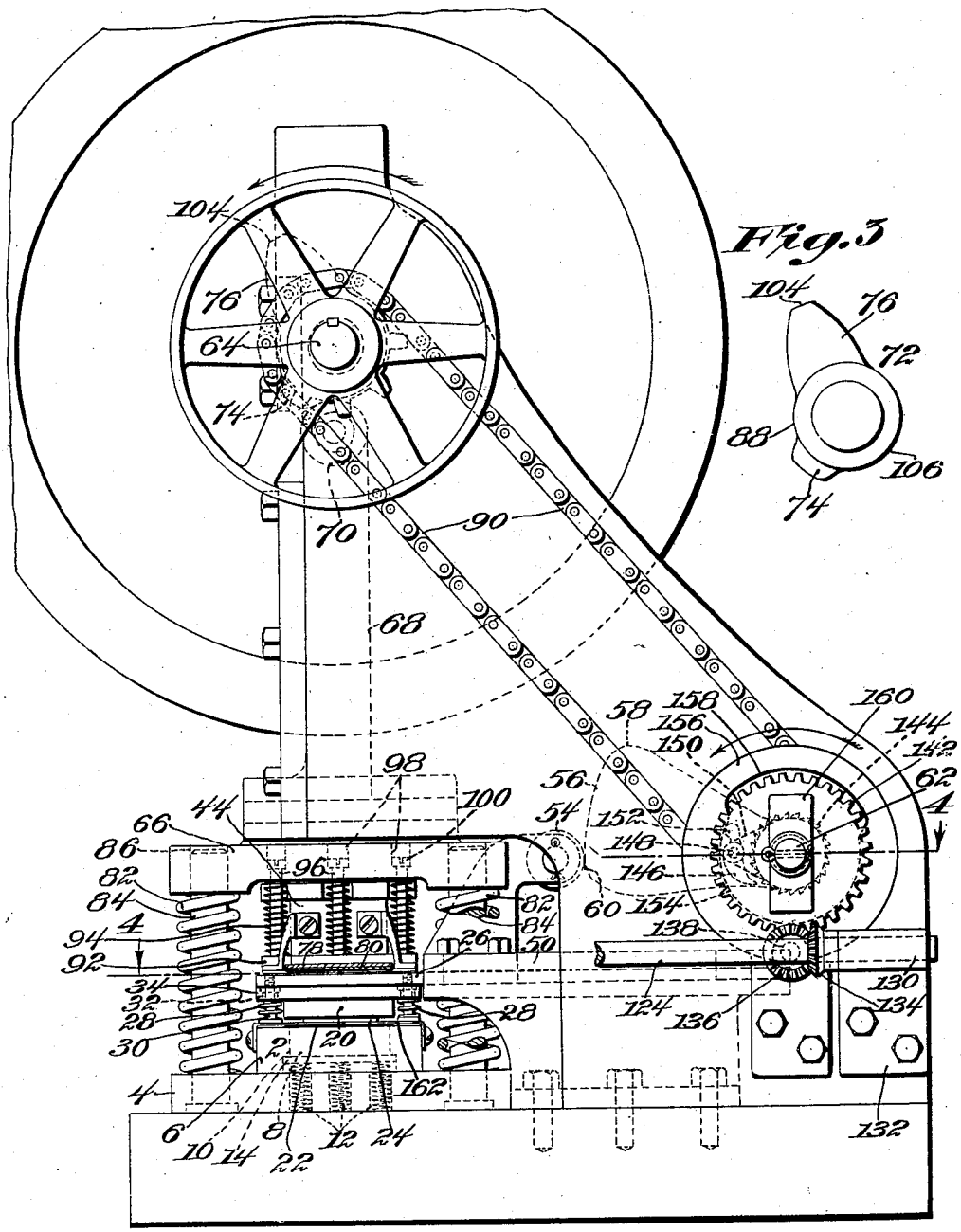

June 3, 1930.   W. MAXWELL ET AL   1,761,020
METHOD OF AND MACHINE FOR MAKING SOLES
Original Filed Sept. 12, 1919   4 Sheets-Sheet 3

Witness
M. G. Crozier

Inventors
Frank W. De Sour
William Maxwell
by their attorneys
Van Everen, Fish, & Hildreth

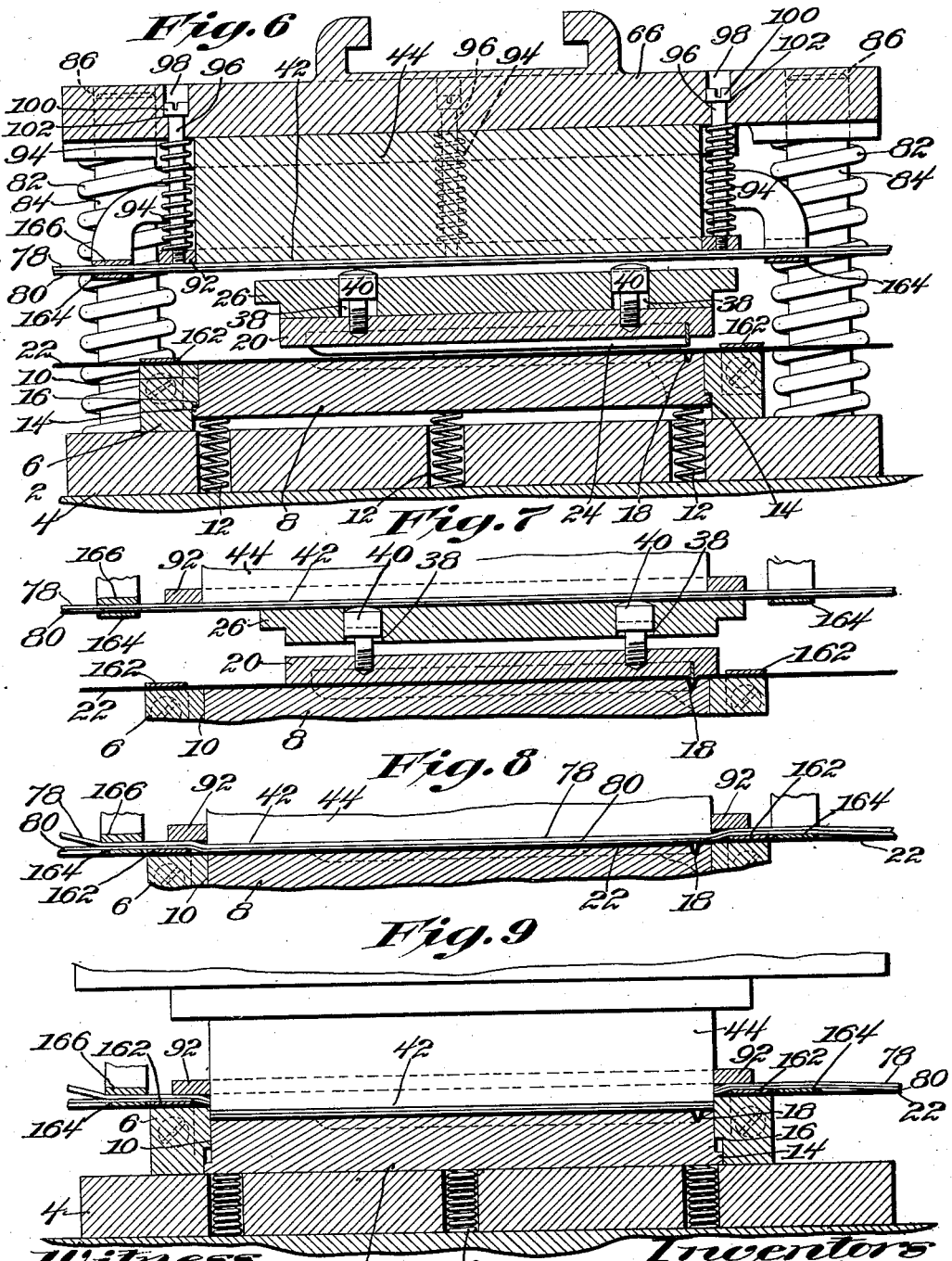

Patented June 3, 1930

1,761,020

UNITED STATES PATENT OFFICE

WILLIAM MAXWELL AND FRANK W. DE TOUR, OF BEVERLY, MASSACHUSETTS, ASSIGNORS TO UNITED SHOE MACHINERY CORPORATION, OF PATERSON, NEW JERSEY, A CORPORATION OF NEW JERSEY

METHOD OF AND MACHINE FOR MAKING SOLES

Application filed September 12, 1919, Serial No. 323,367. Renewed October 12, 1928.

This invention relates to methods of and machines for making soles and more particularly to the making of what are known commercially as manufactured insoles.

Manufactured insoles commonly comprise two or more layers of different kinds of insole material secured together in face to face relation, at least one of the layers being provided on its free face with an upstanding sewing rib, to which the shoe upper may be sewed. The sewing rib extends adjacent the edge of the insole along the shank and forepart portions, thus providing for a marginal feather between the sewing rib and the edge.

A commonly-employed apparatus for making manufactured insoles is disclosed in Letters Patent of the United States No. 563,082 granted June 30, 1896 to George W. Sleeper. According to the method employed with this apparatus, a sheet of insole material, somewhat larger than the size of the desired insole, is placed under pressure between male and female rib-forming molds. After the sewing rib has been thus molded into the sheet of material, the sheet is trimmed along the exterior contour of the molds to form an insole layer. The word "form" applied to this trimming operation and the molding of the rib is employed in the customary sense of giving form or shape. One or more unribbed, previously trimmed insole layers may then be assembled in face to face relation to each other and to the ribbed layer to complete the insole. The various operations of supplying the insole material, molding and trimming it, and securing the layers together are all effected by hand.

An object of the present invention is to improve the present methods of sole-making. With this object in view, the invention provides a method of making manufactured insoles speedily, accurately and efficiently, and also comprehends a machine for carrying out this method. The insole material may be supplied or fed in the form of sheets or strips. Intermittently with the feeding operation, a sewing rib is formed upon one of the strips of insole material, one or more other strips are assembled with the ribbed strip, insole layers are cut from the assembled strips, and the layers with an interposed adhesive are then pressed together to form a completed insole.

A further object of the invention is to provide a machine for making manufactured insoles so designed that the molding, assembling, cutting and pressing operations may all be performed automatically and successively over a single die. To the attainment of this end, the die may be stationary and adapted to function as a mold, a cutter or female punch, and a press. A male mold is preferably arranged over the stationary die, and a combined die, which functions as a cutter or male punch and as a press, is positioned over the male mold. Strips of insole material, appearing in the form of webs, are intermittently fed in between the stationary die and the male mold and between said mold and the uppermost die. The intermediately disposed mold is shown as forced into cooperation with the stationary die by a preliminary movement of the uppermost die to mold a sewing rib in the interposed strip of insole material. The intermediate mold may then be moved out from between the stationary die and the uppermost die, and a final movement imparted to the uppermost die, which descends upon the stationary die to assemble the strips of insole material, cut insole-shaped layers therefrom, and press the layers together to form a completed insole. During the operation of the dies, the feeding mechanism is idle, but becomes operative to move the strips forward when the operation of the dies has been completed.

To the accomplishment of these objects and such others as will hereinafter appear and which will be readily understood by those skilled in the art, the invention comprises the features and combinations of parts hereinafter described and particularly pointed out in the appended claims.

Figure 4:
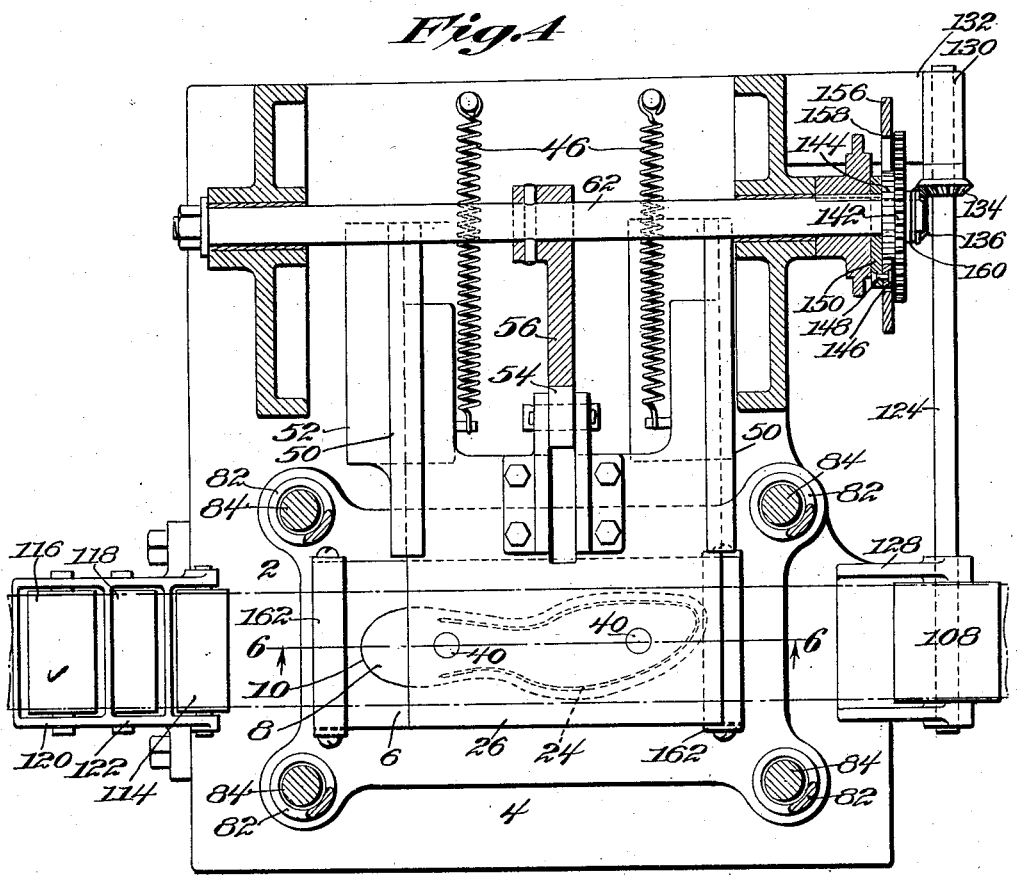
Figure 5:
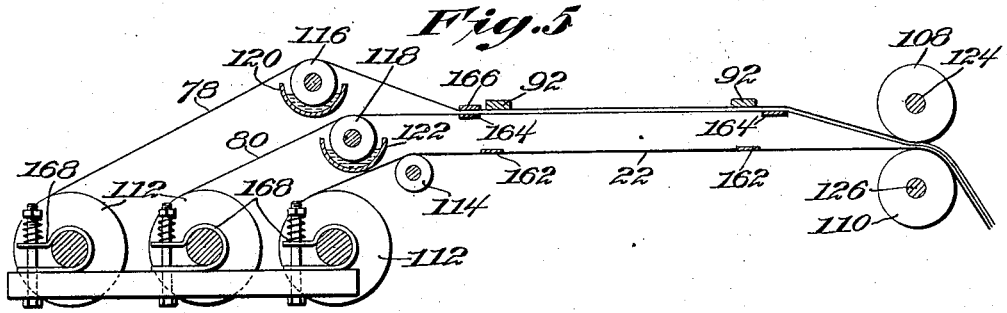

The various features of the invention will be best understood from a description of one embodiment of the machine illustrated in the accompanying drawings, in which Figure 1 is a side elevation of said machine; Fig. 2 is an end elevation of the same with parts broken away; Fig. 3 is a view of the cam which controls the movement of the two upper dies; Fig. 4 is a sectional view taken substantially on the line 4—4 of Fig. 2, looking in the direction of the arrows; Fig. 5 is a diagrammatic view illustrating the manner in which the strips of insole material are fed through the machine; and Figs. 6 to 9 are enlarged, fragmentary, vertical sectional views, taken substantially along the line 6—6 of Fig. 4, and looking in the direction of the arrows, illustrating successive steps in the operation of the machine.

In the embodiment of the invention shown in the drawings, a stationary combined die, indicated generally by the numeral 2, (Figs. 2, 4 and 6) is supported upon a base 4 and comprises a cutting die or female punch 6 and a die 8 which functions as a combined pressure member and female sewing-rib-forming mold. The punch 6 is provided with an interior opening 10 having the shape of an insole so as to be adapted to punch sole-shaped blanks, and the die 8 has the exterior sole-shaped configuration of the opening 10. The punch 6 is fixedly secured to the base 4 and the die 8 is slidably mounted within the opening 10 of the punch 6. Stiff springs 12 (Figs. 2 and 6) tend to force the die 8 upwardly, away from the base 4, and flanges 14 and 16 (Fig. 6) carried respectively by the die 8 and the punch 6, limit the upward movement of the die 8, so as normally to maintain its upper surface in the plane of the upper surface of the punch 6. The die 8 is thus yieldingly confined within the opening 10 of the punch 6. The sole-shaped die 8 is provided along its forepart and shank portions with a marginal groove 18 (Fig. 6) so located adjacent to the edge of the die as to provide the desired width for the feather of the insole. The sewing rib of the insole is molded into this groove. As will appear hereinafter, the upper flat surface of the combined press and mold 8 is one of two surfaces between which the sheets of insole material are pressed together during the assembling of the insole parts. The die 2 thus constitutes a combined pressure member, female punch and female sewing-rib-forming mold.

With the die 8 co-operates a creasing plate or male sewing-rib-forming mold 20 (Figs. 1, 2 and 6) to mold a sewing rib upon a sheet or strip of insole material 22, such as canvas, disposed therebetween. For this purpose, the mold 20 is provided with a rib 24 (Fig. 6) corresponding to, and of substantially the same shape and size as, the groove 18, and which is adapted to enter the groove to effect a molding of the insole material thereinto. The mold 20 is mounted to slide vertically to and from the female mold 8 upon a support or carrier 26 and is normally maintained in its uppermost position upon the support, as shown in Figs. 1 and 2, by compression springs 28. The compression springs are mounted to surround rods 30, that extend through openings 32 provided in side flanges 34 (Figs. 1 and 2) upon the upper portion of the mold 20, which rods are screwed into, or otherwise rigidly secured to, the support 26. The springs 28 rest between the heads of the rods and the under surfaces of the side flanges 34. The support 26 is provided with a pair of openings 38 (Fig. 6) within which slide pressing heads 40 secured to the male mold 20, the upper ends of which are normally above the upper surface of the support 26 (Figs. 1 and 6), when the mold 20 is maintained in its uppermost position by the springs 28. With the heads 40 contacts the active pressing face 42 of a die 44 which functions as a combined male punch and pressure member, as will be hereinafter explained, during a preliminary downward movement of said die. The mold 20 is thereby actuated towards the die 8 in opposition to the force exerted by the springs 28. It will be understood that the above-described mechanism is but one way of bringing about this result. During the downward movement of the mold 20, the sewing rib will be molded or grooved into the strip of insole material 22, the springs 12 being sufficiently stiff to maintain the female mold 8 in its uppermost, illustrated position (Figs. 2 and 6) during this molding operation.

After the die 44 has completed its preliminary downward movement, it is returned to its upper position. Thereafter the mold 20 will be raised upon the support 26, by the springs 28. The support, with the mold, may then be moved out from between the dies 2 and 44 in any suitable way to permit assembling, cutting and pressing operations, upon the interposed sheets of insole material. In the present machine, the removal is effected by tension springs 46 (Fig. 4) secured at one end to the support, and at the other to a stationary part of the machine. To this end, the support is slidably mounted in horizontal slideways 50 (Figs. 1 and 4) that are supported by brackets 52 rising from the base. A roll 54, which is mounted upon the support, is engaged by a cam 56 during the sewing-rib-forming operation to maintain the support over the stationary die, but this roll becomes disengaged from the cam at the point 58 (Fig. 2) after the formation of the sewing rib. The portion 60 of the cam is adapted to engage the roll to restore the support to its position above the stationary die, in opposition to the force exerted by the springs 46, before the commencement of the next sewing-rib-forming operation. The cam is fast upon a shaft 62 rotated in timed relation to a shaft 64.

Following the sewing-rib-forming operation upon the strip of insole material 22, and the retraction of the support 26 by the springs 46, the machine is in readiness for the next operation, which comprises assembling one or more strips of insole material with the ribbed strip, punching out insole layers from the strips, and pressing the layers together to complete the insole. This operation is effected during a second and final downward movement of the die 44. The die 44 is so shaped that its exterior contour is the same as that of the sole-shaped opening 10, and it is of such size as to adapt it to enter the opening 10 to effect a shearing cut upon the material resting upon the die 2. The under surface 42 of the die 44 is flat, so as to adapt it for cooperation with the upper surface of the pressure member and mold 8, to force together the interposed layers of insole material. These pressing surfaces, though shown flat, may, if desired, be so curved as to adapt them for molding the insole material to the surface form which it is desired that the complete insole shall have before it is sewed to the shoe upper. The die 44 is rigidly fastened to a support 66 which is secured to a ram 68 (Figs. 1 and 2) the upper end of which is provided with a roll 70. The roll 70 is engaged by a cam 72 (Figs. 2 and 3) to effect the downward movement of the die 44. The cam 72 is secured upon the shaft 64 and is provided with two risers 74 and 76 of different size.

Initially, just before the formation of the sewing rib upon the strip 22, the various parts of the machine occupy the relative positions indicated in Figs. 1, 2, 4 and 6. The shaft 64 is rotated counter-clockwise, as is indicated by the arrow in Fig. 2, effecting a rotation in a counter-clockwise direction of the cam 72. During the engagement of the riser 74 with the roll 70, the support 26 is maintained in position above the die 2 by the cam 56 acting upon the roll 54, and the die 44 is moved downwardly a comparatively short distance. The face 42 of the die 44 is thus made to engage the upper sheet or strip 78 of a pair of sheets or strips 78 and 80 of insole material, such as imitation leather and canvas, forcing the under face of the strip 80 into contact with the upper portions of the heads 40 (Fig. 6). Further downward movement of the die 44 by the riser 74 effects the sewing-rib-forming operation described above. The relative positions which the parts occupy at this time are illustrated in Fig. 7. When the riser 74 has passed the roll 70, the support 66 is returned to its uppermost position by compression springs 82 surrounding rods or posts 84. The lower ends of the rods 84 are rigidly secured to the base 4, and their upper ends enter openings 86 in the support 66 to permit the slidable movement of the support 66 with respect to the rods 84. When the support 66 is returned to its uppermost position, the roll 70 occupies a position between the risers 74 and 76, indicated in Fig. 3 by the numeral 88.

By means of sprocket gearing 90 connecting the shafts 62 and 64, the former is driven from the latter at the same speed and in the direction of the arrow (Fig. 2). When the riser 74 has freed the roll 70, the cam 56 leaves the roll 54, so that the springs 46 have been permitted to effect the withdrawal of the support 26, and the mold 20 carried thereby, from between the dies 2 and 44. Upon further rotative movement of the shaft 64, the riser 76 engages the roll 70 to effect a second and a greater downward movement of the support 66, and of the die 44 carried thereby. The support 66 carries also a presser plate 92 (Figs. 1, 2 and 6) that is moved downwardly with the die 44. The presser plate is provided with an interior sole-shaped opening through which the die 44 may slide. The presser plate is yieldingly maintained in its lowermost position (Fig. 6) with respect to the support by compression springs 94 surrounding rods 96, shown as screws, the lower ends of which are rigidly secured to the presser plate, and the upper ends of which move freely in openings 98 in the support 66. The downward movement of the presser plate upon the support is limited by enlargements 100 upon the rods 96, which engage interior shoulders 102 provided by counter bores in the upper portions of the openings 98.

As the support 66 descends toward the die 2, the strips of insole material 78 and 80 are forced by the face 42 of the die 44 and by the presser plate 92 against the unribbed face of the ribbed strip 22. When the three strips are thus brought together or assembled, they are clamped by the presser plate 92, as shown in Fig. 8. Upon further downward movement of the support 66, the die 44 is forced into the opening 10 (Fig. 9) shearing or punching the insole portions from the three strips of insole material and forcing a downward movement of the die 8 against the springs 12. The surface 42 of the die 44 and the upper surface of the die 8 then act to press upon the layers. The under surfaces of the strips 78 and 80 being covered with a suitable adhesive, as will hereinafter appear, this pressing operation serves to secure the layers together. A completed insole is thus formed, constituted of three layers of insole material, the grooved layer and the intermediate layer being, for example, of canvas and the remaining layer, which is to be exposed in the interior of the shoe, of imitation leather.

At the completion of the cutting operation, the roll 70 is engaged by the tip 104 of the riser 76 on the cam 72. Upon further rotation of the shaft 64, the tip 104 will become disengaged from the roll 70 and the springs 82 will again effect a return of the support 66 to its uppermost position. The springs 12 will likewise return the die 8 to its normal position. The completed insole may now be removed. The removal may be effected manually or, preferably, by pneumatic pressure supplied from underneath the die 2. To facilitate the pneumatic removal, the machine as a whole may be mounted at an angle upon the base 4, so as to permit the complete insole being ejected into an inclined trough leading to any desired receptacle. The roll 70 will now engage the concentric surface 106 of the cam 72.

Before the cam riser 74 is again rotated into engagement with the roll 70, the strips of insole material, preferably in the form of a ribbon or web, which have lain at rest above the stationary die 2 during the molding, assembling, punching, and pressing operations, must be fed forward so as to deliver unpounched portions of the strips to the dies in preparation for a repetition of the above-described operations. The strip 22 is advanced between the die 2 and the support 26 and the strips 78 and 80 in a path above the operative position of the support 26 and below the die 44, by intermittently operating feed rolls 108 and 110 located at the right-hand side of the machine (Fig. 1). The strips are fed from supply rolls 112 (Fig. 5) at the left-hand side of the machine, the strip 22 passing over an idler roll 114 and the strips 78 and 80 over rolls 116 and 118 that are mounted respectively in troughs 120 and 122 of liquid cement or other adhesive, whereby the under surfaces of the strips 78 and 80 become covered by the adhesive. The strips 78 and 80 may, if desired, be fed from a single roll, having been previously united by an adhesive interposed between them. The feed rolls are mounted upon shafts 124 and 126 having bearings in brackets 128 secured to the base 4. The shaft 124 extends beyond the bracket 128 and is provided with an additional bearing 130 in a bracket 132 (Fig. 4). A bevel gear 134 is carried by the shaft 124 near the end supported by the bearing 130, and meshes with a bevel gear 136 (Figs. 1, 2 and 4) upon a shaft 138. The shaft 138 is mounted below the shaft 62 at right angles to the shaft 124 and carries a spur gear 140, that meshes with a gear 142 normally loosely mounted upon the shaft 62 and adapted to be clutched thereto. When the gear 142 becomes clutched to the shaft 62, a rotative movement is imparted through the gears 140, 136 and 134 to the feed roll 108, and through it and the strips of insole material disposed therebetween, to the feed roll 110.

The gear 142 is arranged to be clutched to the shaft 62 during such time as the roll 70 engages the concentric surface 106 of the cam 72. The feed rolls are thus rotated while the dies are at rest. The clutching mechanism comprises a ratchet wheel 144 (Figs. 1 and 2) secured to the gear 142, they being rotatable on the shaft 62 as a unit. The ratchet wheel is engaged by a pawl 146 that is pivotally mounted at 148 upon a plate 150, that is keyed or otherwise secured to the shaft 62. The tail 152 of the pawl 146 engages a cam surface 154 provided upon a stationary plate 156 to prevent the pawl engaging the ratchet wheel. The continuity of the surface 154 is broken at 158. During the engagement of the tail 152 of the pawl with the unbroken portion of the surface 154, the pawl is disengaged from the ratchet wheel 144, so that the ratchet wheel and the gear 142 do not at this time rotate with the shaft 62. In order to prevent accidental rotative movement by the friction of the shaft a spring 160 is provided. This spring acts as a brake upon the gear 142 and serves also to prevent any backward movement of the feed rolls. Upon the shaft 62 being rotated to a position in which the tail of the pawl 152 is over the broken-away portion 158, the pawl will be forced into engagement with the ratchet wheel. The means for effecting such engagement may be a spring or other means, but in the machine illustrated, the force of gravity is relied upon. Rotative movement of the shaft 62 will then be transmitted, through the pawl and ratchet mechanism, to the feed rolls, which will grip the unpunched margins of the strips 22, 78 and 80 to feed the strips forward. The design of the parts is such that the strips will be advanced a distance equal in length to a little more than the length of the desired insole. By the time the rotation of the shaft 64 has again brought it to the initial, illustrated position (Fig. 2) in which the roll 70 is about to be engaged by the cam riser 74, the tail 152 of the pawl 146 will again have engaged the unbroken portion of the surface 154, removing the pawl from engagement with the ratchet wheel and disconnecting the feed rolls from their motive power. The spring 160 acts at this time as a brake. The cam 56, furthermore, will have returned the support 26, with the mold 20 carried thereby, to a position above the die 2. The above-described cycle of operations will then be repeated, the various steps being performed in timed relation to each other, the dies operating while the feed rolls are idle and the feed rolls operating, after the complete insole has been punched out, while the dies are idle.

Owing to the clamping effect of the presser plate 92, (Figs. 8 and 9) upon the strips of insole material, and to the adhesive applied to the under surfaces of the strips 78 and 80, the marginal, uncut portions of the strips will be somewhat secured together, which would have a tendency to interfere with the return movement of the support 26. Means are therefore provided for positively separating the upper strips from the lowest strip prior to the return of the support. In the embodiment illustrated in the drawings, this result is brought about by having the lowest strip 22 pass under stationary guides 162, (Figs. 1, 5 and 6) and the upper strips over guides 164 that are rigidly mounted upon the support 66. The upward movement of the die 44, therefore, will effect also the upward movement of the upper strips 78 and 80, positively separating them from the strip 22. The left-hand guide 164 is provided with an upper wall 166 which serves to bring the strips 78 and 80 into more intimate contact, so as to facilitate the initial cementing together of these strips. The return movement of the support 26 may also be interfered with if the strips 78 and 80 were permitted to sag under the die 44, an effect likely to occur during the sewing-rib-forming operation through the initial downward movement of the die 44, when the face 42 thereof forces the strips 78 and 80 upon the heads 40. To prevent this sagging effect, the supply rolls 112 are supplied with friction brakes 168 (Fig. 5) strong enough to prevent the feeding of the strip material except in response to the movement of the feed rolls 108 and 110. The parts are so designed that the cement rolls 116 and 118 are approximately in the plane of the die 44 when the die occupies its uppermost position, and the distance between the cement rolls 116 and 118 and the left-hand side of the die 44 is approximately the same as that between the right-hand side of the die 2 and the bite of the feed rolls 108 and 110. The bite between the feed rolls is preferably in the plane of the upper surface of the die 2. The total length of strip material between the cement rolls and the feed rolls will, therefore, be about the same whether the die 44 occupies its uppermost or its lowermost position. As the die 44 is raised and lowered, the strips 78 and 80 move with the die, sliding over the guides 164.

Many changes will occur to those skilled in the art. The feed and supply rolls may be arranged at right angles to the illustrated line of feed. The dies may be provided with double sets of active die faces, the inner edges of which are adjacent to each other, so as to prepare simultaneously two oppositely facing insoles during each cycle of operations, thereby effecting a saving of material. Several strips of material, instead of only one strip 22, may be fed between the stationary die 2 and the male mold 20 and may be grooved together. The number of the other strips 78 and 80 may be increased or diminished, or these other strips omitted altogether in case it is desired to form a ribbed insole constituted of but a single layer. Such and similar changes are intended to be included in the appended claims.

While the particulars of construction here in set forth are well suited to one form of the invention, it is not to be understood that these particulars are essential, since they may be modified without departing from the true scope of the actual invention as defined by the following claims. It will furthermore be understood that certain features of the invention are not limited to insole-making machines, but are of general application, useful in machines of other types.

What is claimed as new is:

1. The method of making manufactured insoles which comprises progressively feeding a sheet of insole material, molding sewing-ribs in the sheet thus advanced, assembling a sheet of insole material with the ribbed sheet, and cutting the assembled sheets to the shape of an insole.

2. The method of making manufactured insoles which comprises intermittently feeding two sheets of insole material, and alternately with the feeding operations forming a sewing-rib in one of the sheets of insole material, assembling the other sheet therewith, and cutting the sheets to the shape of an insole.

3. A machine for making manufactured insoles comprising male and female sewing-rib forming dies, mechanism for intermittently feeding a strip of insole material between said dies, and means for operating said dies during the periods of rest of said feeding mechanism.

4. A machine for making manufactured insoles having, in combination, means for molding a sewing-rib in a sheet of insole material, mechanism for automatically supplying said means with such material, and means for cutting the ribbed material outside of said sewing-rib to produce a sole-shaped layer of ribbed material.

5. A machine for making manufactured insoles having, in combination, means for molding a sheet of insole material to form a sewing-rib thereon, means for superposing a sheet of insole material over the first-named sheet of insole material, and means for cutting the sheets of insole material to the shape of an insole and assembling them face to face.

6. A machine for making manufactured insoles having, in combination, a die, a die cooperating therewith to form a sewing-rib upon a sheet of insole material, and a die cooperating with the first-named die to assemble a sheet of insole material with said ribbed sheet and to cut the assembled sheets of insole material to the shape of an insole.

7. A machine for making manufactured insoles having, in combination, means for feeding a plurality of sheets of insole material, and means for forming a sewing-rib upon one of the sheets of insole material, assembling another sheet of insole material with said ribbed sheet and cutting the assembled sheets of insole material to the shape of an insole.

8. A machine for making manufactured insoles having, in combination, means for feeding two sheets of insole material in superposed relation, a mold located between the sheets of insole material for molding one of the sheets of insole material to form a sewing-rib thereon, means for removing the mold following the molding operation, and a combined cutting and pressing die for cutting the sheets of insole material to the shape of an insole and pressing them together.

9. A machine for making manufactured insoles having, in combination, a die, means for feeding a plurality of sheets of insole material to the die, means cooperating with the die to form a sewing-rib upon one of the sheets of insole material, and means cooperating with the die to assemble another sheet of insole material with said ribbed sheet and to cut the assembled sheets of insole material to the shape of an insole.

10. A machine for making manufactured insoles having, in combination, three dies, means for relatively superposing a sheet of insole material and one of the dies, means for relatively moving said die and another of the dies toward each other to form a sewing-rib upon the sheet of insole material, means for separating said first named die and said other die, means for placing another sheet of insole material adjacent to said first-named die, and means for relatively moving said third-named die and said first-named die toward each other to assemble said sheets of insole material, to cut the assembled sheets of insole material to the shape of an insole and to press the assembled sheets together.

11. A machine for making manufactured insoles having, in combination, three dies normally disposed in superposed relation and adapted to receive a sheet of insole material between each two of the dies, means for relatively moving two adjacent dies to form a sewing-rib upon the sheets of insole material received therebetween, means for removing the intermediately disposed die from between the other two dies, and means for relatively moving the other two dies to assemble the sheets of insole material received therebetween.

12. A machine for making manufactured insoles having, in combination, three dies normally disposed in superposed relation, means for feeding a sheet of insole material between each two of the dies, means for communicating movement from the uppermost die to the intermediately disposed die to cause the movement of the intermediately disposed die toward the lowermost die, thereby to form a sewing-rib upon the sheet of insole material disposed between the intermediately disposed die and the lowermost die, means for removing the intermediately disposed die from over the lowermost die, and means for moving the uppermost die toward the lowermost die to assemble the sheets of insole material disposed therebetween.

13. A machine for making manufactured insoles having, in combination, means for feeding two sheets of insole material in superposed relation, a stationary combined female molding and cutting and pressing die located beneath the sheets of insole material, a male mold located between the sheets of insole material, means for forcing the two dies toward each other to mold one of the sheets of insole material to form a sewing-rib thereon, means for removing the male mold, and a combined male cutting and pressing die for cooperating with the female die to simultaneously cut the sheets of insole material and press them together.

14. A machine having, in combination, a die, a pair of dies for cooperating therewith, a support for slidably supporting one of the pair of dies disposed between the other dies, means carried by one of the other dies for effecting the sliding movement of the supported die towards the other of the other dies, means for removing the support with the die supported thereby from between the other dies, and means for relatively moving the other dies.

15. A machine having, in combination, three normally alined dies, means for feeding a strip of material between each two adjacent dies, the inner face of one of said strips being supplied with adhesive, means whereby the intermediately disposed die and one of the other dies are adapted to cooperate to act upon the strip of material disposed therebetween, means for removing the intermediately disposed die from between the two strips, means for causing said other two dies to cooperate to act upon the strips of material disposed therebetween to assemble them and to cut a blank therefrom, means for separating the uncut portions of the strips, and means for restoring the intermediately disposed die between the two strips.

16. A machine having, in combination, a stationary die, a reciprocating die, means for feeding material between the dies, and means controlled by the reciprocating die for moving the material to and from the stationary die in a path of movement normal to the direction of feed of said material.

17. A machine having, in combination, a stationary die and a reciprocating die, means for limiting the movement of the reciprocating die, means for feeding a strip of material between the dies, supports for the strip at the ends of the dies located at equal distances from the ends, one of the supports being in the plane of the stationary die and the other support being in the plane of the reciprocating die when the reciprocating die occupies its limiting position away from the stationary die, and means carried at the ends of the reciprocating die for slidingly reciprocating the strip in response to the reciprocation of the reciprocating die.

18. The method of making manufactured insoles which comprises progressively feeding strip insole material, molding sewing-ribs therein, progressively feeding other strip insole material, and assembling the other insole material with the ribbed insole material.

19. A machine for making manufactured insoles having, in combination, means for molding a sewing-rib in a sheet of insole material, mechanism for automatically supplying said means with such material, and means for cutting the material outside of said sewing-rib to produce a sole-shaped layer of ribbed material.

20. A machine for making manufactured insoles having, in combination, means for intermittently advancing superposed sheets of insole material to operating position, means at the operating position acting during an intermittence in advance for applying pressure to the sheets to cause them to be secured face to face, and means at the operating position for further operating upon the secured sheets.

21. The method of making soles which consists in associating a plurality of layers of sole-material in a composite piece, positioning the composite piece and another piece of sole-material in preparation for their assembly, forming a projection in the last-mentioned piece while thus positioned, assembling the formed piece and composite piece, and cutting the assembled pieces to sole-shape.

22. The method of making soles which consists in advancing pieces of sole-material, applying a coating of adhesive to one of the pieces during its advance, forming a projection in one of the pieces, assembling the pieces with the coated side of one in contact with another piece after such formation, and cutting the assembled pieces to sole-shape.

23. The method of making soles which consists in advancing pieces of sole-material, applying a coating of adhesive to a piece during its advance, forming a projection in a piece, assembling with the coated and formed piece another piece of sole-material, and cutting the assembled pieces to sole-shape.

24. The method of making soles which consists in forming a projection in a piece of sole-material, associating a plurality of layers of sole-material in a composite piece, applying an adhesive to one of the pieces, and assembling the pieces and simultaneously therewith cutting the assembled pieces to sole-shape.

25. The method of making insoles which consists in molding a sewing rib in a piece of insole-material, associating a plurality of layers of insole-material in a composite piece; and assembling the ribbed piece and composite piece and simultaneously therewith cutting the assembled pieces to insole-shape.

26. The method of making soles which consists in superposing sheets of sole-material, forming one of the superposed sheets, pressing the sheet into engagement with one another, and forming the thus associated sheets, the superposed relation being constantly maintained during the forming and pressing operations.

27. The method of making insoles which consists in superposing sheets of insole-material, molding a sewing rib in one of the superposed sheets, pressing the ribbed sheet and another sheet together, and cutting the thus-associated sheets to insole-shape, the superposed relation being constantly maintained during the molding, pressing and cutting operations.

28. The method of making soles which consists in superposing sheets of sole-material, forming one of the superposed sheets by pressure exerted through another of the sheets, and further applying pressure to simultaneously assemble and form the sheets.

29. The method of making insoles which consists in superposing sheets of insole-material, forming a sewing rib in one of the superposed sheets, and further applying pressure to both assemble the sheets and cut them to insole-shape.

30. The method of making soles which consists in progressively advancing a sheet of sole-material, forming a projection in the sheet thus advanced, assembling a sheet of sole-material with the formed sheet, and cutting the assembled sheets to sole-shape.

31. The method of making soles which consists in progressively advancing webs of sole-material, applying a coating of adhesive to an advancing web, forming a projection in a web, assembling the coated and formed webs, and cutting the assembled webs to sole-shape.

32. The method of making soles which consists in progressively advancing a plurality of sheets of sole-material, forming a projection in one of the sheets thus advanced, pressing together the formed sheet and another of the advanced sheets, and cutting the thus assembled sheets to sole-shape.

33. The method of making soles which consists in progressively advancing a plurality of sheets of sole-material, applying coatings of adhesive to different sheets, forming a projection in one of the sheets, pressing together the coated and formed sheets, and cutting the thus-assembled sheets to sole-shape.

34. In a sole-making apparatus, means for assembling sole-portions and for cutting the assembled portions, and means for feeding plural pieces of sole-material to the assembling and cutting means.

35. In a sole-making apparatus, means for assembling sole-portions and for cutting the assembled portions to the contour of the sole, and means for advancing webs of sole-material to the assembling and cutting means.

36. In a sole-making apparatus, means for molding and assembling sole-portions and for cutting the molded and assembled portions, and means for feeding plural pieces of sole-material to the molding, assembling and cutting means.

37. In a sole-making apparatus, means for forming a projection in a sole-portion, means for assembling the formed portion and another sole-portion, means for cutting the formed and assembled portions to sole-shape, and means for feeding plural pieces of sole-material to the forming, assembling and cutting means.

38. In a sole-making apparatus, co-operating forming dies and cutting dies, said co-operating dies being arranged to act upon opposite sides of sole-material, means for operating said dies to first form sole-material and then trim it to sole-shape, and means for supplying sole-material to the dies.

39. In an insole-making apparatus, a pair of sewing-rib-molding dies, means for feeding insole material between said dies, an assembling die co-operating with one of the molding dies, means for feeding insole material to the assembling die and its companion molding die, and a trimming die co-operating with one of the molding dies.

40. In a sole-making apparatus, means for assembling sole-portions and for cutting the assembled portions, and means for applying an adhesive to one of the portions.

41. In a sole-making apparatus, means for assembling sole-portions and for cutting the assembled portions to the contour of a sole, and means for simultaneously applying an adhesive to different portions.

42. In a sole-making apparatus, means for assembling the sole-portions and for cutting the assembled portions to the contour of a sole, means for feeding plural pieces of sole-material to the assembling and cutting means, and means for applying an adhesive to the sole-material during its feed.

43. In a sole-making apparatus, means for assembling sole-portions and for cutting the assembled portions to the contour of a sole, means for advancing webs of sole-material to the assembling and cutting means, and means for applying a coating to one of the webs.

44. In a sole-making apparatus, means for assembling sole-portions and for cutting the assembled portions to the contour of a sole, means for advancing webs of sole-material to the assembling and cutting means, and means for applying a coating to the webs during their advance.

45. In a sole-making apparatus, pairs of opposed forming dies and cutting dies, means for operating said dies to first form sole-material and then trim it to sole-shape, means for supplying sole-material to the dies, and means for applying an adhesive to the supplied material.

46. In an insole-making apparatus, a pair of sewing-rib-molding dies, means for feeding web insole-material between said dies, an assembling die co-operating with one of the molding dies, means for feeding insole-material to the assembling die and its companion molding die, and means for applying an adhesive to the last-mentioned material.

47. In a sole-making apparatus, forming means comprising relatively movable members, means for moving the members relatively to produce a forming effect, means for changing the relation between a member and the associated members, and means for thereafter moving said associated members relatively into engagement with a different portion of the sole from that first acted upon to produce a forming effect independent of that previously produced by the members.

48. In a sole-making apparatus, cutting and molding members relatively movable into and out of co-operation, and molding means movable into and out of the path of one of the members and arranged for operation thereby.

49. In a sole-making apparatus, trimming members relatively movable into and out of co-operation, and rib-forming means movable into and out of the path of a trimming member.

50. In an insole-making apparatus, normally spaced co-operating dies arranged to trim insole-blanks, and a sewing-rib-molding die movable between the trimming dies.

51. In an insole-making apparatus, normally spaced co-operating dies arranged to trim insole-blanks, means for moving said dies relatively toward and from each other, and a sewing-rib-molding die movable between the trimming dies and in the direction of movement of said dies.

52. In an insole-making apparatus, normally spaced co-operating dies arranged to trim insole blanks, means for moving said dies relatively toward and from each other, a carrier movable between the trimming dies, and a sewing-rib-molding die yieldably mounted upon the carrier.

53. In an insole-making apparatus, normally spaced co-operating dies arranged to trim insole blanks, means for moving said dies relatively toward and from each other, a carrier movable between the trimming dies, and a sewing-rib-molding die yieldably mounted upon the carrier and arranged to be actuated by one of the trimming dies in its movement.

54. In a sole-making apparatus, a forming member having an opening, a member situated within the opening and adapted to effect a forming operation, and independent forming members co-operating with those previously mentioned in the successive performance of their respective operations.

55. In a sole-making apparatus, a trimming member having an opening, a member movable in the opening and adapted to form a projection, and forming members co-operating respectively with the trimming and projection-forming members.

56. In a sole-making apparatus, a forming member having an opening, a pressure member acting outside the opening, a member movable in the opening and adapted to effect a forming operation, and independent forming members co-operating with those previously mentioned.

57. In a sole-making apparatus, a trimming member having an opening, a pressure member bearing upon the material outside the opening to hold it for the trimming operation, a member movable in the opening and adapted to form a projection, and members co-operating respectively with the trimming and projection-forming members.

58. In a sole-making apparatus, a forming member having an opening, a member movable in the opening and adapted to effect a forming operation, a forming member arranged to enter the opening, and a forming member movable into and out of the path of the last-mentioned forming member for co-operation with the member in the opening.

59. In a sole-making apparatus, a trimming member having an opening, a co-operating trimming member arranged to enter the opening, a member yieldably mounted in the opening and adapted to form a projection, and a co-operating projection-forming member movable into the path of the last-mentioned trimming member.

60. In an insole-making apparatus, insole-trimming dies, one having an opening and the other fitting the opening, means for moving the dies relatively to effect their co-operation, a sewing-rib-molding die yieldably mounted in the opening of the trimming die, and a co-operating sewing-rib-molding die movable between the trimming dies.

61. In an insole-making apparatus, insole-trimming dies, one having an opening and the other fitting the opening, means for moving the dies relatively to effect their co-operation, an insole-material-clamping member associated with the trimming dies, a sewing-rib-molding die yieldably mounted in the opening of the trimming die, and a co-operating sewing-rib-molding die movable between the trimming dies.

62. In an insole-making apparatus, insole-trimming dies, one having an opening and the other fitting the opening, means for moving the dies relatively to effect their co-operation, an insole-material-clamping member movable with a trimming die, a sewing-rib-molding die yieldably mounted in the opening of the trimming die, and a co-operating sewing-rib-molding die movable between the trimming dies.

63. In an insole-making apparatus, insole-trimming dies, one having an opening and the other fitting the opening, means for moving the dies relatively to effect their co-operation, a sewing-rib-molding die yieldably mounted in the opening of the trimming die, and a co-operating sewing-rib-molding die movable between the trimming dies and arranged to be moved by a trimming die.

64. In a sole-making apparatus, a combination cutting and molding die, a mold co-operating with the die, and a punch co-operating with said die.

65. In an insole-making apparatus, a reciprocatory rib-molding and blank-trimming device, adhesive-applying means at one side of said device, and feeding means situated at the opposite side of the device and arranged to draw insole-material from the applying means for successive operations upon it.

WM. MAXWELL.
FRANK W. DE TOUR.